US012706780B2

(12) United States Patent
Farmanbar et al.

(10) Patent No.: US 12,706,780 B2
(45) Date of Patent: Aug. 11, 2026

(54) CHANNEL ESTIMATION WITH VARYING NUMBERS OF TRANSMIT LAYERS

(71) Applicant: Dell Products L.P., Round Rock, TX (US)

(72) Inventors: Hamidreza Farmanbar, Ottawa (CA); Gwenael Poitau, Montreal (CA); Evgeny Paltin, Montreal (CA)

(73) Assignee: Dell Products L.P., Round Rock, TX (US)

(*) Notice: Subject to any disclaimer, the term of this patent is extended or adjusted under 35 U.S.C. 154(b) by 125 days.

(21) Appl. No.: 18/784,437

(22) Filed: Jul. 25, 2024

(65) Prior Publication Data

US 2026/0032020 A1 Jan. 29, 2026

(51) Int. Cl.
*H04L 25/02* (2006.01)

(52) U.S. Cl.
CPC ........ *H04L 25/025* (2013.01); *H04L 25/0254* (2013.01)

(58) Field of Classification Search
CPC ............... H04L 25/025; H04L 25/0254; H04L 25/0204; H04L 25/0224; H04L 25/0256
See application file for complete search history.

(56) References Cited

U.S. PATENT DOCUMENTS 5,566,209 A * 10/1996 Forssen ................ H01Q 3/2605 375/349
10,517,082 B2 * 12/2019 Baligh ................... H04B 7/024
10,992,331 B2 * 4/2021 Jassal ....................... G06N 3/09
(Continued)

FOREIGN PATENT DOCUMENTS

CA 2945375 C * 10/2022 ......... H04L 25/0224
CN 1694442 A * 11/2005 ........... H04L 25/025
(Continued)

OTHER PUBLICATIONS

B. K. Engiz, Ç. Kurnaz and G. Kayhan, "Performance evaluation of ANN based channel interpolation for OFDM system," 2012 International Symposium on Innovations in Intelligent Systems and Applications, Trabzon, Turkey, 2012, pp. 1-5, (Year: 2012).*
(Continued)

*Primary Examiner* — Berhanu Tadese
(74) *Attorney, Agent, or Firm* — Amin, Turocy & Watson, LLP

(57) ABSTRACT

A system can produce a rough channel estimate that comprises a first array of a first number of dimensions, wherein a communications channel enables broadband cellular communications, and wherein the communications channel is configured for multiple-input multiple-output transmission. The system can transform the first array into second arrays, wherein respective second arrays of the second arrays have a second number of dimensions that is one less than the first number of dimensions. The system can process the respective second arrays using a neural network that is configured to process arrays having the second number of dimensions, to produce third arrays. The system can combine the third arrays into a fourth array having the first number of dimensions, wherein the fourth array indicates a second channel estimate. The system can use the fourth array for the broadband cellular communications with the at least one user equipment.

20 Claims, 11 Drawing Sheets

(56) References Cited

U.S. PATENT DOCUMENTS 12,166,606 B2 * 12/2024 Nguyen .............. H04L 25/0204
12,218,781 B2 * 2/2025 Kwon ................. H04L 27/2639
12,494,950 B2 * 12/2025 Upalekar ................ H04J 13/18
2012/0182964 A1 * 7/2012 Gao ..................... H04J 11/0033
370/330
2017/0289984 A1 * 10/2017 Baligh ...................... H04L 1/08
2020/0366326 A1 * 11/2020 Jassal ..................... G06N 3/045
2022/0303159 A1 * 9/2022 Nguyen .............. H04L 25/0204
2022/0337455 A1 * 10/2022 Kwon ................. H04L 25/0254
2023/0125699 A1 * 4/2023 Chen ................... H04L 25/0224
375/262
2023/0327917 A1 * 10/2023 Upalekar ................ H04J 13/18
2023/0327918 A1 * 10/2023 Upalekar ................ H04J 13/18
2024/0113919 A1 * 4/2024 Pratik ................. H04L 25/0254
2024/0275643 A1 * 8/2024 Xiao ...................... G06N 3/045
2024/0396766 A1 * 11/2024 Jeong ................... G06N 3/0475
2024/0396767 A1 * 11/2024 Chen ................... H04L 25/0254
2024/0414030 A1 * 12/2024 Penna ................. H04L 25/0204
2025/0062936 A1 * 2/2025 Medeiros .............. H04L 5/0051
2025/0317257 A1 * 10/2025 Regev ................... H04L 25/025
2025/0350501 A1 * 11/2025 Pratik ................. H04L 25/0224

FOREIGN PATENT DOCUMENTS

CN 101364966 A * 2/2009
CN 100536448 C * 9/2009
CN 101132381 B * 8/2010
CN 101076001 B * 3/2011
CN 101364966 B * 3/2011
CN 101867533 B * 10/2012 ........... H04B 7/0697
CN 102025662 B * 4/2015
CN 104539562 A * 4/2015
CN 104702543 B * 5/2018
CN 111628946 A * 9/2020 ............. G06N 3/045
CN 111786923 A * 10/2020 ......... H04L 25/0256
CN 111884685 A * 11/2020 ............. G06N 3/045
CN 111884976 A * 11/2020 ............. G06N 3/045
CN 112532548 A * 3/2021 ............. G06N 3/045
CN 112737985 A * 4/2021 ............. G06N 3/045
CN 111884685 B * 8/2021 ............. G06N 3/045
CN 111884976 B * 9/2021 ............. G06N 3/045
CN 113726711 A * 11/2021 ......... H04L 27/2672
CN 114598575 A * 6/2022 ............. G06N 3/045
CN 114745233 A * 7/2022 ......... H04L 25/0202
CN 114826832 A * 7/2022 ............. G06N 3/045
CN 114844749 A * 8/2022 ....... H04L 25/03006
CN 114884775 A * 8/2022 ......... H04L 25/0254
CN 114938319 A * 8/2022 ........... H04B 7/0456
CN 114745233 B * 3/2023 ......... H04L 25/0228
CN 112737985 B * 4/2023 ......... H04L 25/0242
CN 116319196 A * 6/2023 ......... H04L 25/0254
CN 116319196 B * 8/2023 ......... H04L 25/0254
CN 113726711 B * 9/2023 ......... H04L 27/2695
CN 117040974 A * 11/2023 ......... H04L 25/0204
CN 117040989 A * 11/2023 ......... H04L 27/2695
CN 117136528 A * 11/2023 ......... H04L 25/0254
CN 114938319 B * 12/2023 ......... H04L 25/0204
CN 114598575 B * 1/2024 ......... H04L 25/0242
CN 112532548 B * 2/2024 ......... H04L 25/0254
CN 114826832 B * 5/2024 ......... H04L 25/0224
CN 118020077 A * 5/2024 ......... H04L 25/0232
CN 118160247 A * 6/2024 ........... G06N 3/0475
CN 118282811 A * 7/2024 ............... G06N 3/08
CN 115664897 B * 8/2024
CN 118784406 A * 10/2024 ......... H04L 27/2666
CN 118890241 A * 11/2024 ......... H04L 25/0204
CN 118972207 A * 11/2024 ........... G06N 3/0464
CN 119450501 A * 2/2025 ............. G06N 3/084
CN 119583285 A * 3/2025 ........... H04L 1/0057
CN 119856453 A * 4/2025 ......... H04L 25/0256
CN 120017449 A * 5/2025 ............. G06N 3/084
CN 120236599 A * 7/2025 ......... G10L 21/0308
CN 120281444 A * 7/2025 ........... H04B 17/309
CN 120281610 A * 7/2025 ........... H04B 7/0413
CN 117040989 B * 9/2025 ......... H04L 25/0224
CN 118972207 B * 10/2025 ........... G06N 3/0464
CN 120811832 A * 10/2025 ......... H04B 7/04013
CN 120856506 A * 10/2025 ........... H04W 24/02
CN 118890241 B * 11/2025 ......... H04L 25/0204
CN 120236599 B * 11/2025 ......... G10L 21/0308
DE 102022106961 A1 * 10/2022 ......... H04L 25/0254
EP 0693246 B1 * 4/2000 .......... H04W 52/346
EP 3430853 B1 * 8/2020 ............ H04W 72/20
EP 4391464 A2 * 6/2024 ........... G06N 3/0464
EP 4429132 A1 * 9/2024 ........... G06N 3/0475
FI 20205980 A9 * 4/2024 ............... G06N 3/09
FR 3144460 A1 * 6/2024 ........... G06N 3/0464
KR 20220019828 A * 2/2022 ......... H04L 25/0254
KR 20220141750 A * 10/2022 ......... H04L 25/0256
KR 20220146142 A * 11/2022 .......... H04W 72/542
KR 20230000970 A * 1/2023 ............... G06F 8/35
KR 20240175306 A * 12/2024 ......... H04L 25/0254
KR 20250083936 A * 6/2025 ........... G06N 3/0464
KR 20250105252 A * 7/2025 ............. H04N 23/90
TW 202502018 A * 1/2025 ......... H04L 25/0204
WO WO-9522873 A2 * 8/1995 .......... H04W 52/343
WO WO-2021175444 A1 * 9/2021 ......... H04L 25/0254
WO WO-2022074639 A2 * 4/2022 ............. G06N 3/045
WO WO-2022222116 A1 * 10/2022 ......... H04L 25/0254
WO WO-2023041143 A1 * 3/2023 ....... H04L 27/26532
WO WO-2023041202 A1 * 3/2023 ....... H04L 27/26532
WO WO-2023057064 A1 * 4/2023 ......... H04L 25/0232
WO WO-2023070675 A1 * 5/2023 ........... G06N 3/0475
WO WO-2023104317 A1 * 6/2023 ......... H04L 25/0224
WO WO-2024054563 A1 * 3/2024 ............ H04W 24/08
WO WO-2024064354 A1 * 3/2024 ......... H04L 25/0254
WO WO-2024083303 A1 * 4/2024 ......... H04L 25/0254
WO WO-2024158340 A1 * 8/2024 ............... G06N 3/08
WO WO-2025028911 A1 * 2/2025 ............. G06N 3/084
WO WO-2025098020 A1 * 5/2025 ............. H04L 25/02
WO WO-2025129080 A1 * 6/2025 ........... H04L 5/0094
WO WO-2025148744 A1 * 7/2025 ........... H04B 7/0413
WO WO-2025195431 A1 * 9/2025 ......... H04L 25/0254
WO WO-2025195431 A9 * 11/2025 ......... H04L 25/0254
WO WO-2025230223 A1 * 11/2025 ............ H04W 24/02
WO WO-2025240014 A1 * 11/2025 ......... H04L 27/2613
WO WO-2025244409 A1 * 11/2025 ............. H04L 27/26

OTHER PUBLICATIONS

S. J. Lee, “On the training of MIMO-OFDM channels with least square channel estimation and linear interpolation,” in IEEE Communications Letters, vol. 12, No. 2, pp. 100-102, Feb. 2008, (Year: 2008).*

L. Ge et al., “Deep Neural Network Based Channel Estimation for Massive MIMO-OFDM Systems With Imperfect Channel State Information,” in IEEE Systems Journal, vol. 16, No. 3, pp. 4675-4685, Sep. 2022, (Year: 2022).*

W. Luo, W. Ji, Y. Song and B. Zheng, “Deep Learning-based Channel Estimation Approach for 3D Massive MIMO Millimeter-Wave System in Time-Varying Environments,” 2021 (Year: 2021).*

J. Lee, S. Ahn, S.-I. Park and J. Kang, “Alternative Meta-Learning With 3D Dual-CNN for MIMO Channel Estimation,” in IEEE Wireless Communications Letters, vol. 14, No. 11, pp. 3650-3654, Nov. 2025, (Year: 2025).*

Haesik Kim, “Channel Estimation and Equalization,” in Wireless Communications Systems Design , Wiley, 2015, pp. 279-299, (Year: 2015).*

* cited by examiner

802

PERFORMING A LEAST SQUARES CHANNEL ESTIMATION AND INTERPOLATION WITH RESPECT TO A COMMUNICATIONS CHANNEL TO PRODUCE A ROUGH CHANNEL ESTIMATE, WHEREIN THE ROUGH CHANNEL ESTIMATE COMPRISES A FIRST ARRAY OF A FIRST NUMBER OF DIMENSIONS, WHEREIN THE COMMUNICATIONS CHANNEL ENABLES BROADBAND CELLULAR COMMUNICATIONS WITH AT LEAST ONE USER EQUIPMENT, AND WHEREIN THE COMMUNICATIONS CHANNEL IS CONFIGURED FOR MULTIPLE-INPUT MULTIPLE-OUTPUT TRANSMISSION 804

TRANSFORMING THE FIRST ARRAY INTO SECOND ARRAYS, WHEREIN RESPECTIVE SECOND ARRAYS OF THE SECOND ARRAYS HAVE A SECOND NUMBER OF DIMENSIONS, AND WHEREIN THE SECOND NUMBER IS ONE LESS THAN THE FIRST NUMBER OF DIMENSIONS 806

PROCESSING THE RESPECTIVE SECOND ARRAYS USING A NEURAL NETWORK THAT IS CONFIGURED TO PROCESS ARRAYS HAVING THE SECOND NUMBER OF DIMENSIONS, TO PRODUCE THIRD ARRAYS 808

COMBINING THE THIRD ARRAYS INTO A FOURTH ARRAY HAVING THE FIRST NUMBER OF DIMENSIONS, WHEREIN THE FOURTH ARRAY INDICATES A SECOND CHANNEL ESTIMATE 810

USING THE FOURTH ARRAY FOR THE BROADBAND CELLULAR COMMUNICATIONS WITH THE AT LEAST ONE USER EQUIPMENT 812

814

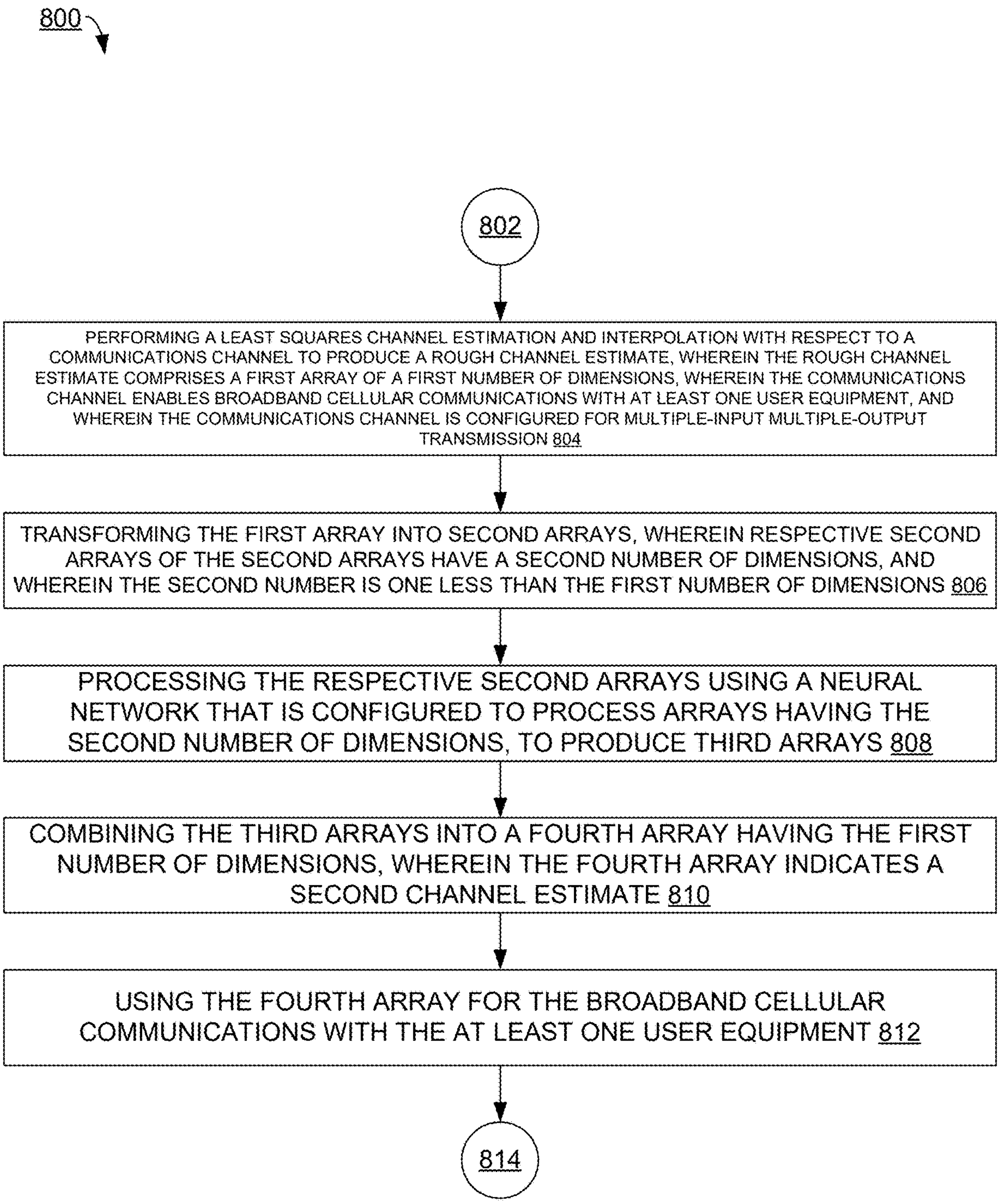

TRANSFORMING A FIRST ARRAY INTO SECOND ARRAYS, WHEREIN THE FIRST ARRAY COMPRISES A ROUGH CHANNEL ESTIMATE OVER A FIRST NUMBER OF DIMENSIONS, WHEREIN RESPECTIVE SECOND ARRAYS OF THE SECOND ARRAYS HAVE A SECOND NUMBER OF DIMENSIONS, AND WHEREIN THE SECOND NUMBER IS LESS THAN THE FIRST NUMBER 904

PROCESSING THE RESPECTIVE SECOND ARRAYS WITH A NEURAL NETWORK THAT IS CONFIGURED TO PROCESS ARRAYS HAVING THE SECOND NUMBER OF DIMENSIONS, TO PRODUCE THIRD ARRAYS 906

COMBINING THE THIRD ARRAYS INTO A FOURTH ARRAY HAVING THE FIRST NUMBER OF DIMENSIONS, WHEREIN THE FOURTH ARRAY INDICATES A CHANNEL ESTIMATE 908

USING THE FOURTH ARRAY FOR BROADBAND CELLULAR COMMUNICATIONS WITH AT LEAST ONE USER EQUIPMENT 910

912

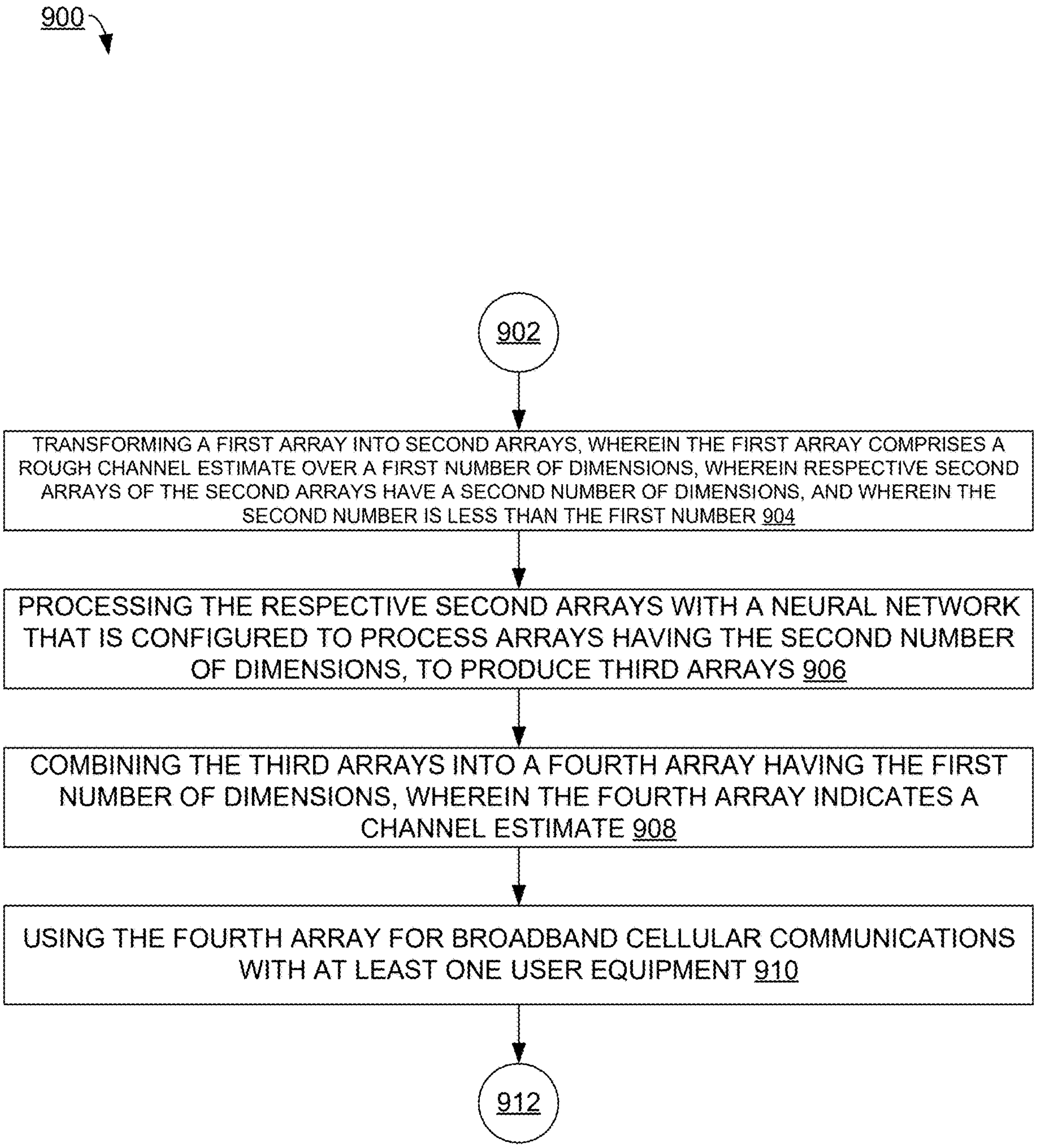

TRANSFORMING A ROUGH CHANNEL ESTIMATE ARRAY THAT COMPRISES A FIRST NUMBER OF DIMENSIONS AND A DIMENSION THAT INDICATES A NUMBER OF TRANSMIT LAYERS INTO FIRST ARRAYS HAVING A SECOND NUMBER OF DIMENSIONS, WHEREIN RESPECTIVE FIRST ARRAYS OF THE FIRST ARRAYS OMIT AN INDICATION OF THE NUMBER OF TRANSMIT LAYERS 1004

INPUTTING THE FIRST ARRAYS TO A NEURAL NETWORK THAT IS CONFIGURED TO ACCEPT, AS INPUT, ARRAYS HAVING THE SECOND NUMBER OF DIMENSIONS, THE INPUTTING RESULTING IN AN OUTPUT OF SECOND ARRAYS 1006

TRANSFORMING THE SECOND ARRAYS INTO A THIRD ARRAY THAT INDICATES A CHANNEL ESTIMATION AND THAT HAS THE FIRST NUMBER OF DIMENSIONS 1008

USING THE CHANNEL ESTIMATION AS INDICATED BY THE THIRD ARRAY FOR MULTIPLE-INPUT MULTIPLE-OUTPUT CELLULAR COMMUNICATIONS WITH A USER EQUIPMENT 1010

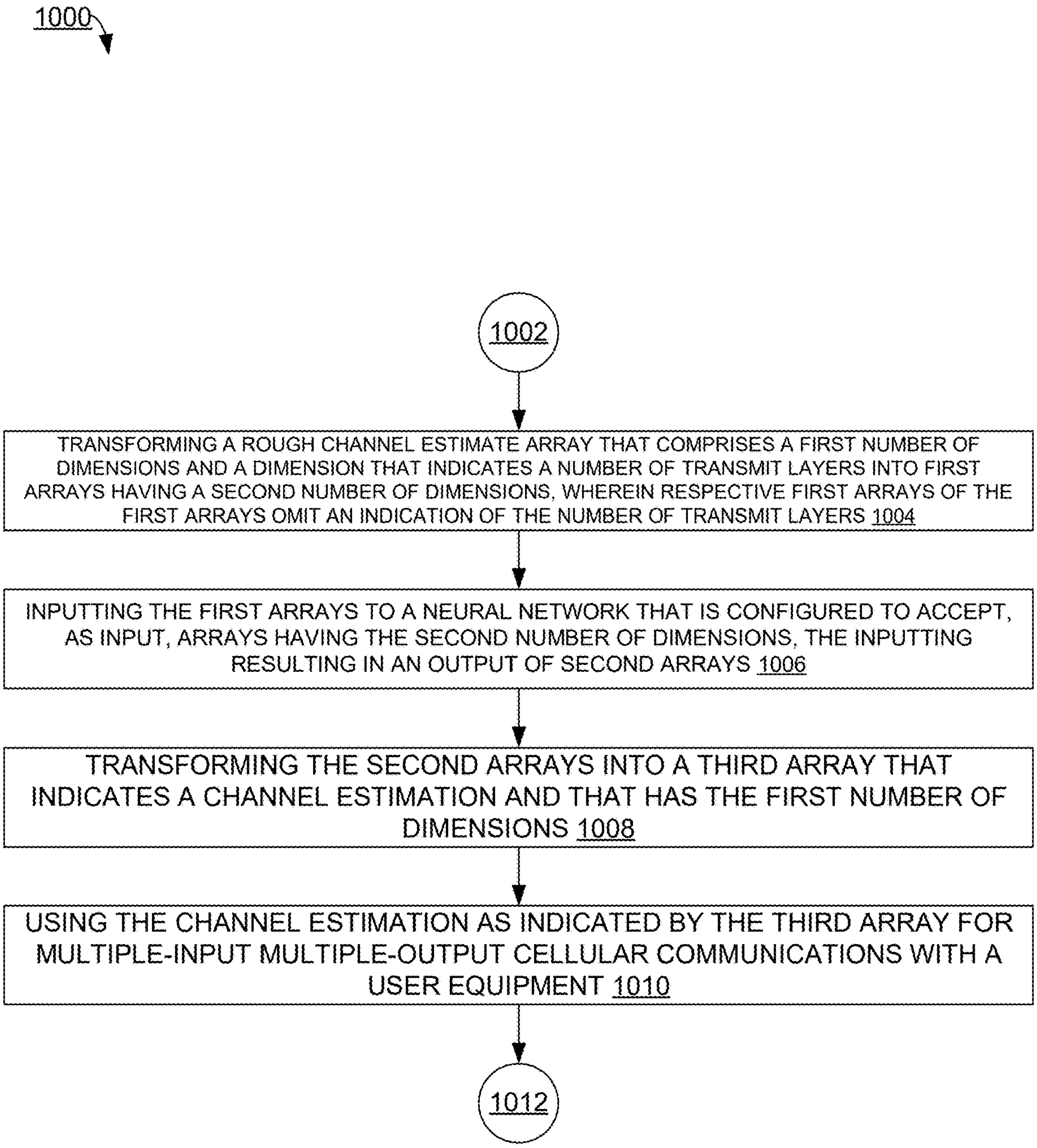

FIG. 10

CHANNEL ESTIMATION WITH VARYING NUMBERS OF TRANSMIT LAYERS

BACKGROUND

User equipment (UE) can communicate with a base station as part of broadband cellular communications.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can perform a least squares channel estimation and interpolation with respect to a communications channel to produce a rough channel estimate, wherein the rough channel estimate comprises a first array of a first number of dimensions, wherein the communications channel enables broadband cellular communications with at least one user equipment, and wherein the communications channel is configured for multiple-input multiple-output transmission. The system can transform the first array into second arrays, wherein respective second arrays of the second arrays have a second number of dimensions, and wherein the second number is one less than the first number of dimensions. The system can process the respective second arrays using a neural network that is configured to process arrays having the second number of dimensions, to produce third arrays. The system can combine the third arrays into a fourth array having the first number of dimensions, wherein the fourth array indicates a second channel estimate. The system can use the fourth array for the broadband cellular communications with the at least one user equipment.

An example method can comprise transforming, by a system comprising at least one processor, a first array into second arrays, wherein the first array comprises a rough channel estimate over a first number of dimensions, wherein respective second arrays of the second arrays have a second number of dimensions, and wherein the second number is less than the first number. The method can further comprise processing the respective second arrays with a neural network that is configured to process arrays having the second number of dimensions, to produce third arrays. The method can further comprise combining the third arrays into a fourth array having the first number of dimensions, wherein the fourth array indicates a channel estimate. The method can further comprise using the fourth array for broadband cellular communications with at least one user equipment.

An example non-transitory computer-readable medium can comprise instructions that, in response to execution, cause a system comprising a processor to perform operations. These operations can comprise transforming a rough channel estimate array that comprises a first number of dimensions and a dimension that indicates a number of transmit layers into first arrays having a second number of dimensions, wherein respective first arrays of the first arrays omit an indication of the number of transmit layers. These operations can further comprise inputting the first arrays to a neural network that is configured to accept, as input, arrays having the second number of dimensions, the inputting resulting in an output of second arrays. These operations can further comprise transforming the second arrays into a third array that indicates a channel estimation and that has the first number of dimensions. These operations can further comprise using the channel estimation as indicated by the third array for multiple-input multiple-output cellular communications with a user equipment.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates an example process flow that can facilitate channel estimation with varying numbers of transmit layers, in accordance with an embodiment of this disclosure;

FIG. 9 illustrates another example process flow that can facilitate channel estimation with varying numbers of transmit layers, in accordance with an embodiment of this disclosure;

FIG. 10 illustrates another example process flow that can facilitate channel estimation with varying numbers of transmit layers, in accordance with an embodiment of this disclosure;

DETAILED DESCRIPTION

Overview

The present examples generally relate to fifth generation new radio (5G NR) broadband cellular communications. It can be appreciated that the present techniques can be applied to other types of cellular communications, such as those using Long-Term Evolution (LTE) or sixth generation (6G) technologies.

In multiple-input multiple-output (MIMO) transmission, multiple streams of data can be transmitted through multiple transmit layers. In such a scenario, it can be that the wireless channel must be estimated for each transmit (Tx) layer at the receiver. In downlink transmission, where user equipment (UE) is at a receive end, it can be that up to 8 transmit layers are supported for single user MIMO in fifth generation new radio (5G NR) technologies. In uplink transmission, where a gNodeB (gNB, sometimes referred to as a base station) is at the receive end, up to four transmit layers can be supported from each UE.

Figure 4:
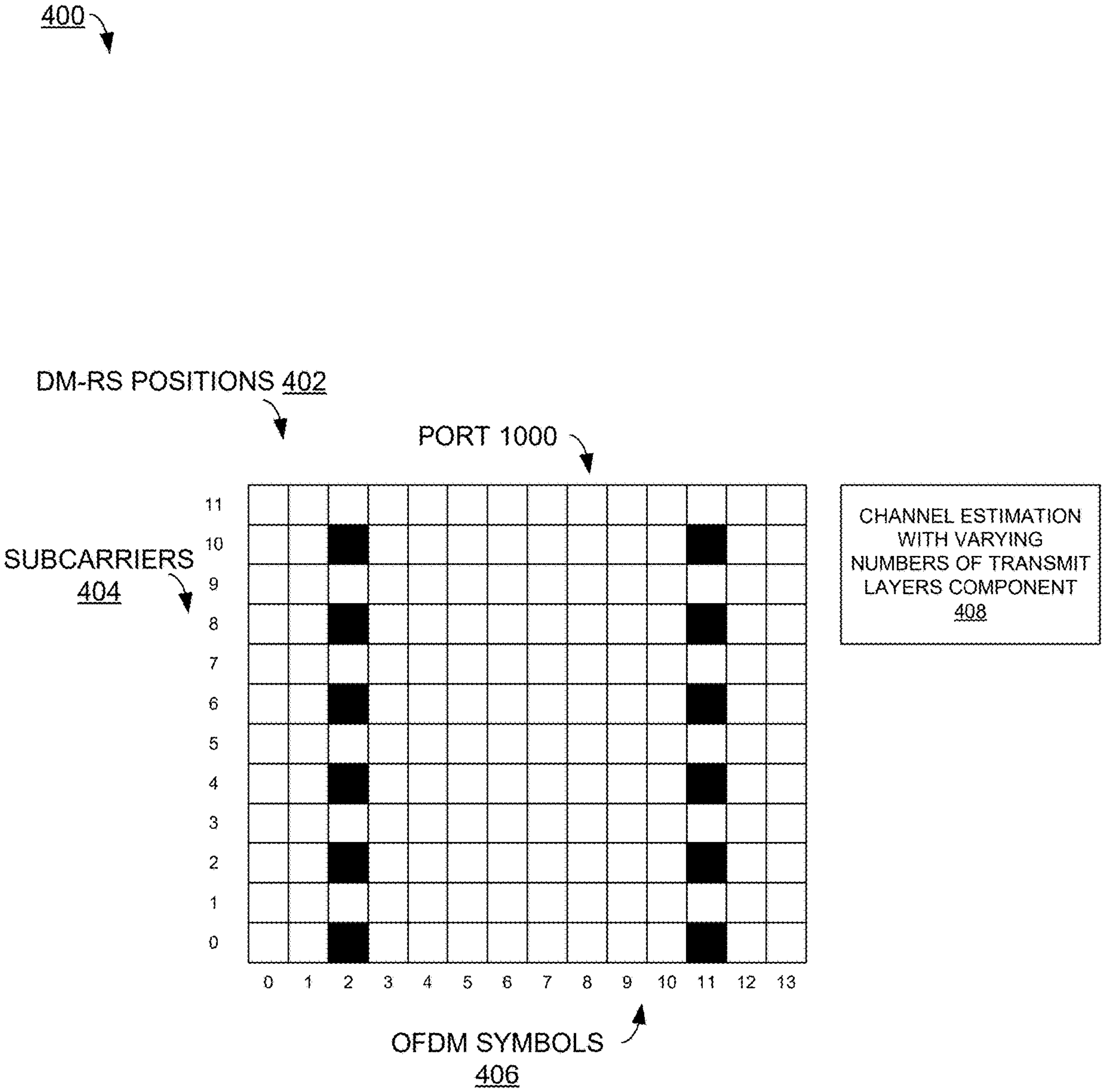
FIG. 4 illustrates an example of a demodulation reference signal (DM-RS) grid that can facilitate channel estimation with varying numbers of transmit layers, in accordance with an embodiment of this disclosure.

The number of transmit layers can impact the channel estimation problem size. That is, a channel estimation algorithm input and output dimensions can be dependent on the input parameters as follows:

Channel estimation input: A sparse three-dimensional (3-D) array of received signals with dimensions (K, N, R) corresponding to demodulation reference signals (DM-RS) positions (FIG. 4 shows the first two dimensions), Channel estimation output: A four-dimensional (4-D) array of estimated channels with dimensions (K, N, R, L), where, K and N define the UE physical resource block (PRB) set scheduled for transmission, R=number of receiver (Rx) antennas, and L=number of transmit layers. $K_1$ denotes the number of DM-RS symbols in the PRB set per pilot-carrying orthogonal frequency division multiplexing (OFDM) symbols, and $N_1$ denotes the number pilot carrying OFDM symbols in a slot. As an example, if a UE's PRB set is one PRB as shown in FIG. 4, then K=12, N=14, $K_1$=6, and $N_1$=2.

A problem in a neural network (NN) based channel estimation can be that a single NN architecture cannot address all possible channel estimation problem sizes. In particular, it can be that the fixed input and output layer size of a given NN can only match a specific channel estimation problem size. Prior approaches for artificial intelligence/machine learning (AI/ML)-based techniques can specify a NN architecture that matches a specific channel estimation problem size (that is, a pre-defined number of transmit layers, etc.), and train the NN with channel sample data corresponding to the same number of Tx layers. It can be that that such a trained NN cannot be used for another channel estimation problem with different number of Tx layers.

Figure 2:
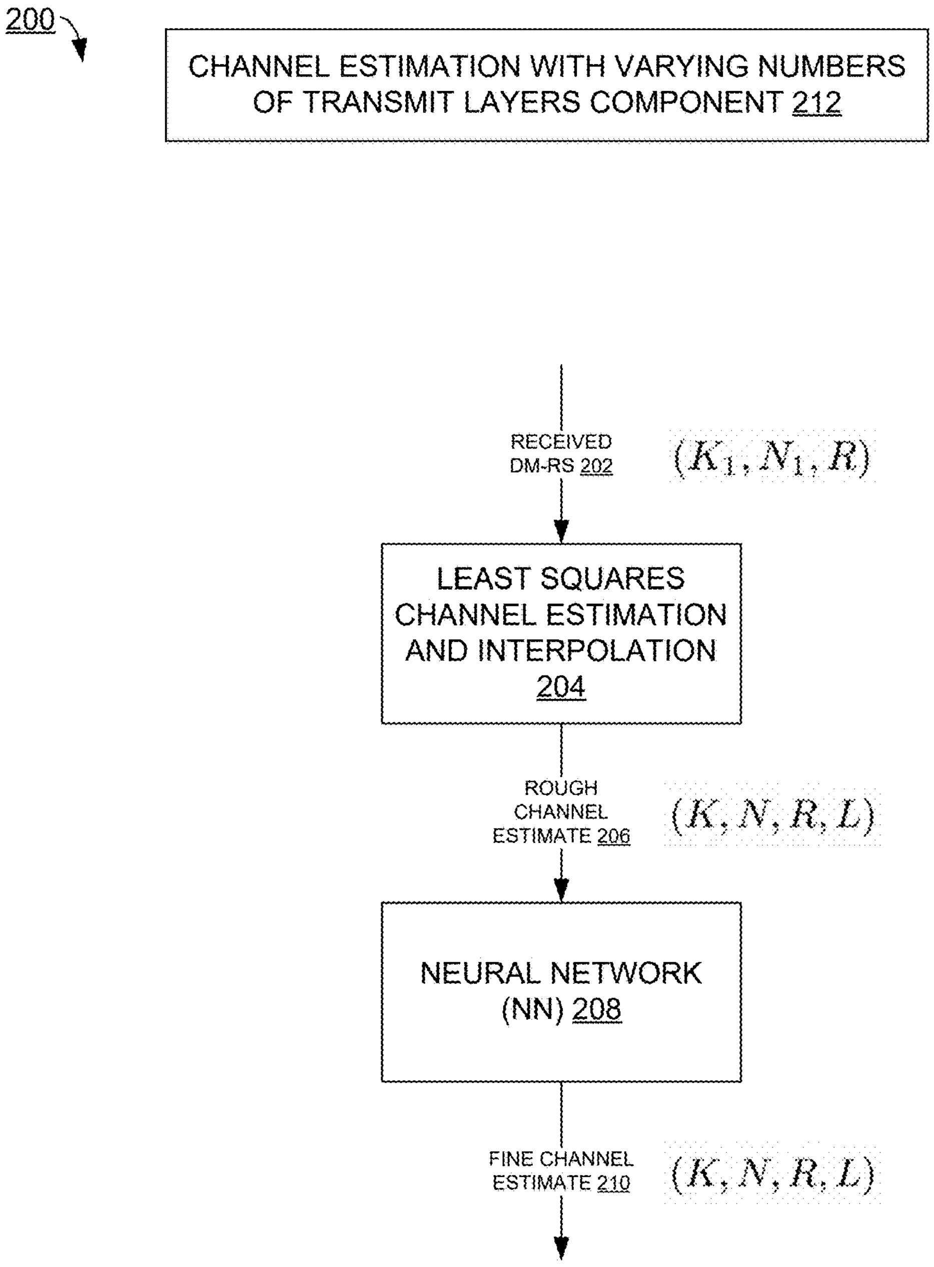
FIG. 2 illustrates an example system architecture for neural-network-based channel estimation, in accordance with an embodiment of this disclosure.

FIG. 2 shows a block diagram of an NN-based channel estimation technique. The input is the received DM-RS in a sparse 3-D array of size (K, N, R). Given the received DM-RS, the channel corresponding to DM-RS positions in the array can be estimated using a least squares (LS) technique. Then, interpolation can be used to obtain rough channel estimates in all points of the 4-D channel array of dimensions (K, N, R, L). Then, a neural network that is dimensioned for and trained with channel samples with the above dimensions can be used to obtain fine channel estimates.

In contrast, the present techniques can be implemented to facilitate NN-based channel estimation techniques that work for an arbitrary number of Tx layers, using a single NN architecture.

Figure 3:
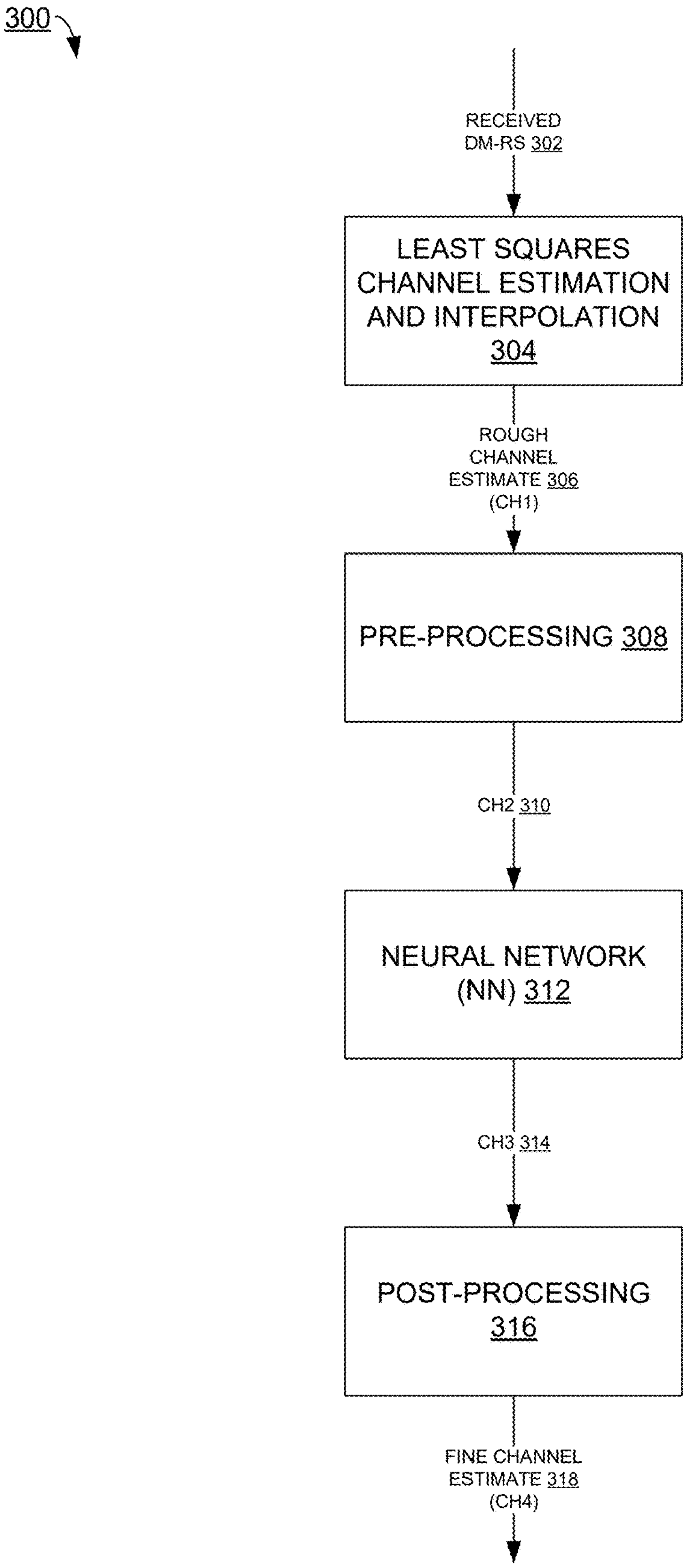
FIG. 3 illustrates another example system architecture that can facilitate channel estimation with varying numbers of transmit layers, in accordance with an embodiment of this disclosure.

As shown in FIG. 3, the present techniques can be implemented to facilitate an AI-based channel estimation technique to address the varying number of Tx layers can comprise:

a pre-processing unit that can take in the rough channel estimate array by a LS estimation and interpolation component, and turns it into L arrays with one less dimension;

a NN that is properly dimensioned and trained to process the above arrays with one less dimension; and a post-processing unit that can take in the output of the NN for each of the L processed arrays with one less dimension and combines them into an array with dimensions matching the original rough channel estimate array dimensions.

Pre-processing can be implemented such that the size of the arrays at the output of the pre-processing unit is independent of L (number of Tx layers). Those arrays can then be processed by a NN in a serial manner. The arrays at the output of the NN can then be combined into a final channel estimate array with the same dimension as the rough channel estimate array. A dependence of channel estimation problem size to the number of Rx antennas can be resolved by pre-/post-processing units so that one single NN can be used for channel estimation for arbitrary number of Tx layer.

The present techniques can be implemented to facilitate splitting of the channel input array in the Tx layer dimension in order to add flexibility in AI/ML channel estimation in terms of varying a number of Tx layers. This can be realized through specific operations introduced in pre-processing and post-processing units before and after NN. In some examples, splitting and combining operations according to the present techniques can impact the input/output dimensions for the NN(s) to be used along with pre- and post-processing units. However, such input/output dimensions can be independent of a number of Tx layers.

In prior NN-based channel estimation techniques, the NN is dimensioned for and trained with a specific channel estimation dimension size including the number of Tx layers (FIG. 2). A problem with these prior approaches can be their inflexibility to be used for a different channel estimation problem with different parameters. In other words, with prior approaches, it can be that a new NN with different dimensions must be designed and trained for a new channel estimation problem.

There can be challenges in an implementation of AI-based techniques that are flexible to accommodate a wide range of parameters, impacting the size of the problem under consideration. The following is a description of a 5G NR channel estimation problem, and an explanation of the impact of parameters on the size/dimension of a channel estimation problem.

In coherent communication, channel knowledge can be needed at a receiver in order to detect the transmitted modulated symbols. Channel knowledge at the receiver can be realized by transmitting pilot symbols along with data symbols. The pilot symbols can be known to the receiver. The receiver can estimate the channel using the received pilot symbols, which have gone through the channel.

In 3rd Generation Partnership Project (3GPP) terminology, the pilot symbols designed for a purpose of symbol demodulation at the receiver are called demodulation reference signals (DM-RS). In OFDM, DM-RS can be assigned to resource elements (RE) within a physical resource block (PRB) according to specific patterns specified in 5G NR standards. FIG. 4 shows an example DM-RS configuration in a PRB. DM-RS symbols (shown in gray) are spread across a two dimensional (2-D) grid of subcarriers and OFDM symbols (which can be referred to as a 2-D frequency-time grid), according to configurable periodicities in order to provide acceptable channel estimation accuracy depending on wireless channel frequency/time selectivity.

Figure 5:
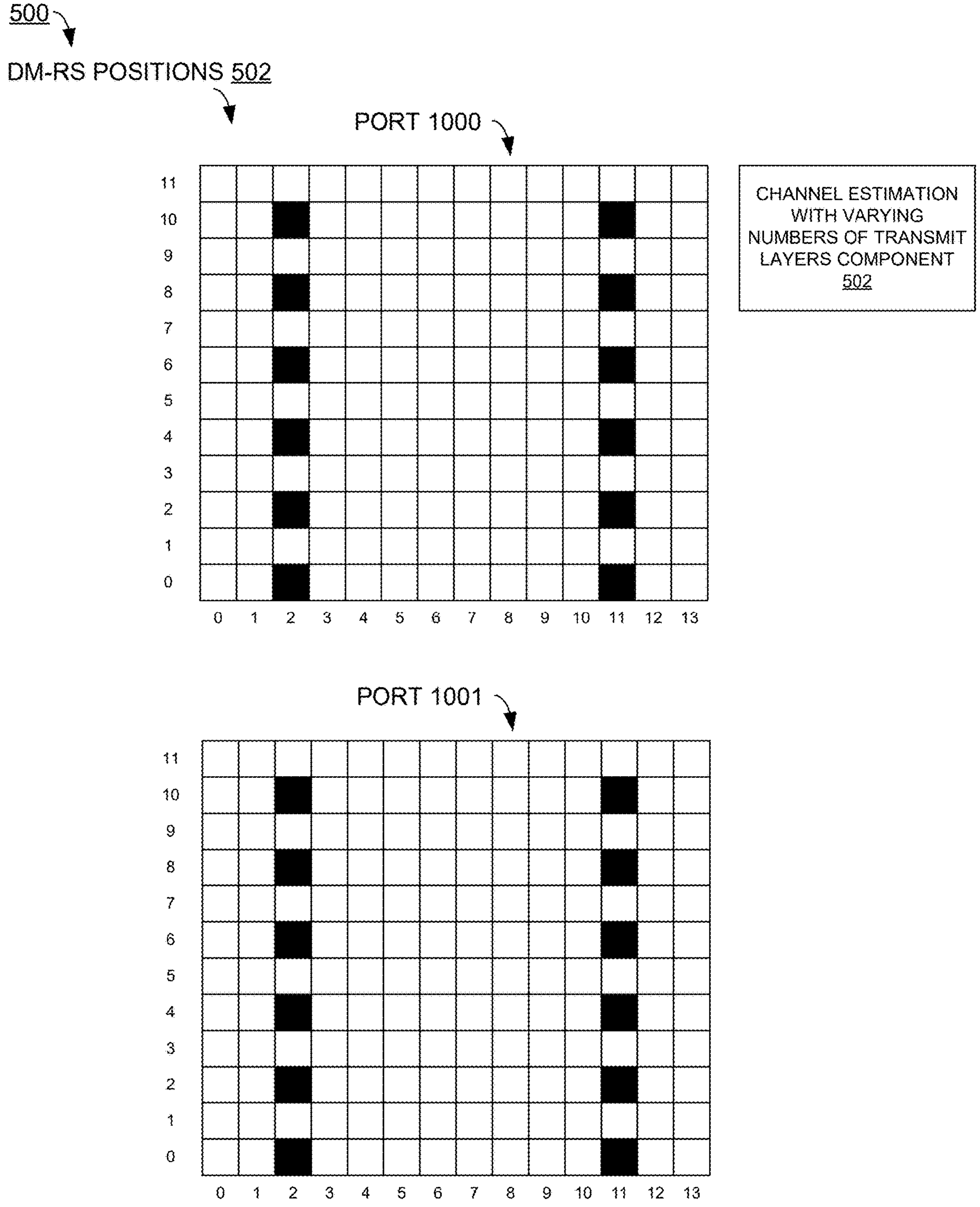
FIG. 5 and FIG. 6 illustrate an example of a DM-RS grid for four antenna ports that can facilitate channel estimation with varying numbers of transmit layers, in accordance with an embodiment of this disclosure.

In multiple-input multiple-output (MIMO) transmission where multiple transmit layers of data are transmitted, it can be that the channel corresponding to each layer must be estimated at each receiver (Rx) antenna. This can add two more dimensions to the channel grid that must be estimated. In a MIMO scenario, multiple DM-RS can be transmitted, corresponding to different transmit antenna ports. The DM-RS corresponding to different antenna ports can be separated (that is, not interfere) in any of time, frequency, or code domain. DM-RS can be assigned to resource elements (RE) within a physical resource block (PRB) according to specific configurations specified in 3GPP NR standard. FIG. 5 shows an example DM-RS mapping in a PRB grid for 4 DM-RS ports to support up to 4-layer uplink transmission. As it can be seen in this example, DM-RS on Ports 1000 and 1001 are transmitted on the same REs and interfere with each other. The same can be true for DM-RS transmitted on Ports 1002, 1003. The interference across the two ports can be resolved using a code division multiplexing (CDM) operation.

DM-RS symbols can be spread across subcarriers and OFDM symbols according to different periodicities. The DM-RS density across subcarriers can be configurable using a parameter DM-RS type. The DM-RS density across OFDM symbols can also be configurable by up to 4 OFDM symbols in a slot. A dense DM-RS pattern can result in more accurate channel estimation performance at a price of occupying more resources within PRBs that could be used for data transmission otherwise.

A channel estimation technique can use, as input, the received signal corresponding to DM-RS positions. However, for data symbol demodulation, it can be that channel estimates are needed at REs where data symbols are transmitted. Therefore, the channel estimation can involve interpolation or extrapolation to find channel estimates at all RE locations within a frequency-time grid.

A rough channel estimate provided by LS channel estimation and interpolation (FIG. 3) can be denoted by a five-dimensional (5-D) array CH1 with dimensions (K, N, R, L, numSamples), where, K and N indicates the UE PRB set scheduled for physical uplink shared channel (PUSCH) transmission, R indicates a number of receiver (Rx) antennas, L indicates a number of transmit layers, and numSamples indicates the number of channel samples.

In an example where the size of any of the dimensions is one, then CH1 can be represented as an array with a smaller dimension. For example, if L=1 and numSamples=1, CH1 can be represented as a 3-D array with dimensions (K, N, R). Examples of the present techniques can be based on a general case where CH1 has all 5 dimensions. These techniques can be implemented using pre-/post-processing units.

In a pre-processing unit, a 5-D array CH1 can be turned into a 4-D array CH2 by a one-to-one mapping as shown in (1):

$$CH1{:}(K, N, R, L, num\text{Samples}) \rightarrow CH2{:}(K, N, R, L \times num\text{Samples}) \quad (1)$$

As shown in (1), the impact of L in CH2 can be removed by treating any sample in CH1 corresponding to a given Tx layer as an extra channel sample in CH2. In other words, the number of channel samples in CH2 is L×numSamples.

In some examples, any one-to-one mapping that satisfies the conversions of dimensions in (1) can be used with the present techniques. In some examples, a one-to-one mapping that preserves the frequency-time correlation structure of channel array can be used and can facilitate a high-performance implementation. An example of such one-to-one mapping can be given by:

$$CH2{:}(k, n, r, s + (l-1) \times num\text{Samples}) = CH1{:}(k, n, r, l, s), \quad (2)$$
$$1 \le k \le K,$$
$$1 \le n \le N,$$
$$1 \le r \le R,$$
$$1 \le l \le L,$$
$$1 \le s \le num\text{Samples}.$$

A NN that is dimensioned for, and trained with, samples of the same form as CH2 can be used to process each sample in CH2 and provide output CH3 with the same form as CH2. It can be that the input/output layer dimensions of a NN only depends on K, N, and R.

Th-processing takes the output of NN and maps it to CH4 (which has the same dimensions as CH1) according to (3):

$$CH4{:}(k, n, r, l, s) = CH3{:}(k, n, r, s + (l-1) \times num\text{Samples}), \quad (3)$$
$$1 \le k \le K,$$
$$1 \le n \le N,$$
$$1 \le r \le R,$$
$$1 \le l \le L,$$
$$1 \le s \le num\text{Samples}.$$

The following experimental results have been observed. In order to study the performance a NN-based channel estimation technique, consider a 2×2 channel (L=2 Tx layers, R=2 Rx antennas). In this example, a UE is scheduled over 4 PRBs (K=48, N=14) for uplink transmission. Two DM-RS ports, namely, 1000, 1001, as shown in FIG. 5, are used for data transmission and channel estimation. The pre-processing unit can split the 5-D rough channel estimate array produced by LS estimation and interpolation with dimensions (48,14,2,2, numSamples) into a 4-D array with dimensions (48,14,2,2×numSamples). Therefore, the NN (as in FIG. 3) deals with inputs of size (K=48, N=14, R=2) which is independent of L. A NN according to prior approaches as shown in FIG. 2, deals with inputs of size (K=48, N=14, R=2, L=2) in contrast. As discussed before, it can be that the prior approach does not work for a different channel estimation problem with L≠2 unless a new NN is trained that matches the channel estimation problem size. This problem can be resolved with the present techniques through appropriate pre- and post-processing operations.

Figure 7:
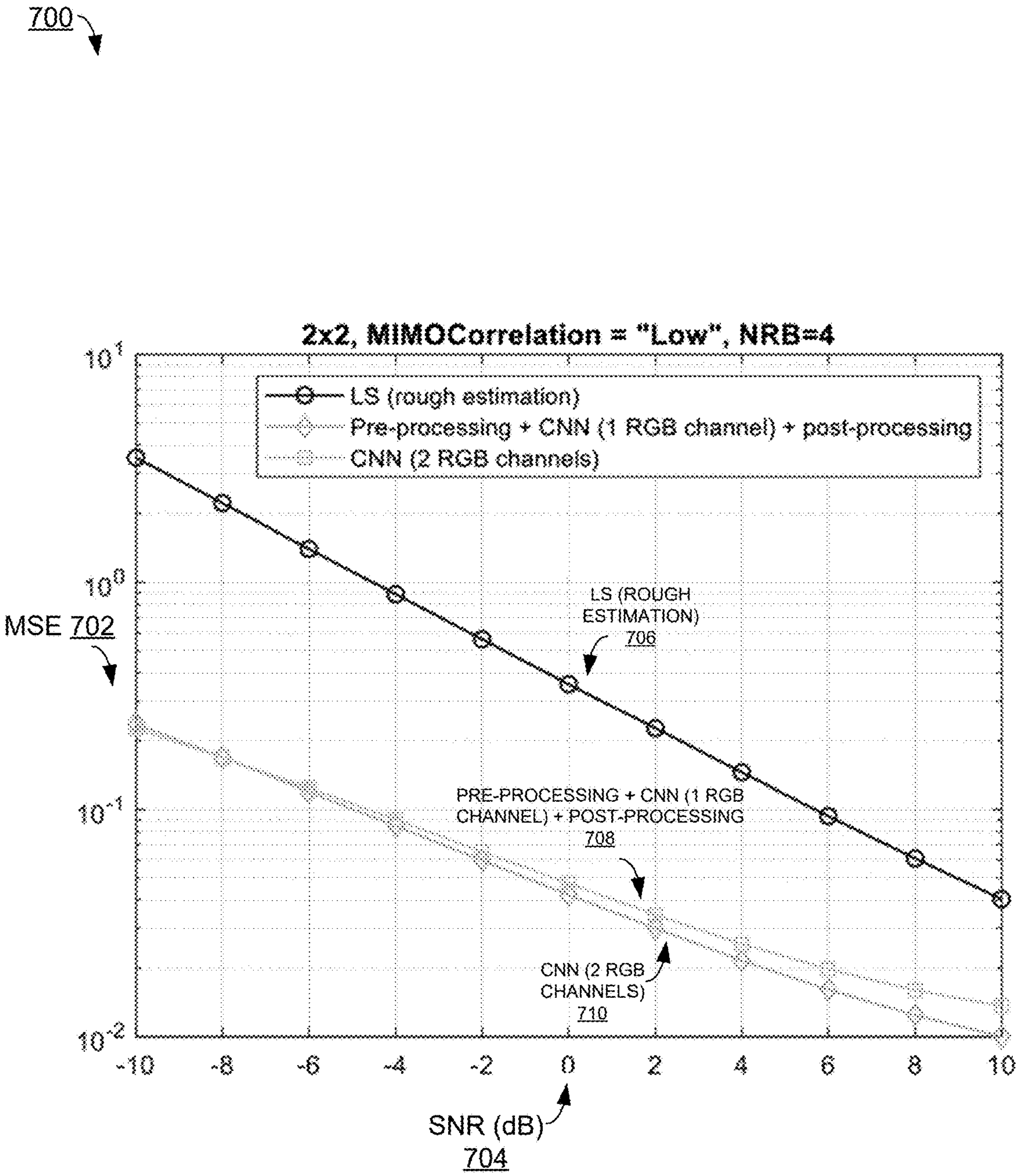
FIG. 7 illustrates an example graph of 2×2 channel estimation mean squared error (MSE) performance that can facilitate channel estimation with varying numbers of transmit layers, in accordance with an embodiment of this disclosure.

As shown in FIG. 7, the present techniques and prior approaches have similar MSE performance. An advantage of the present techniques can be a flexibility to handle various number of Tx layers using the same NN architecture.

Example Architectures, Etc.

Figure 1:
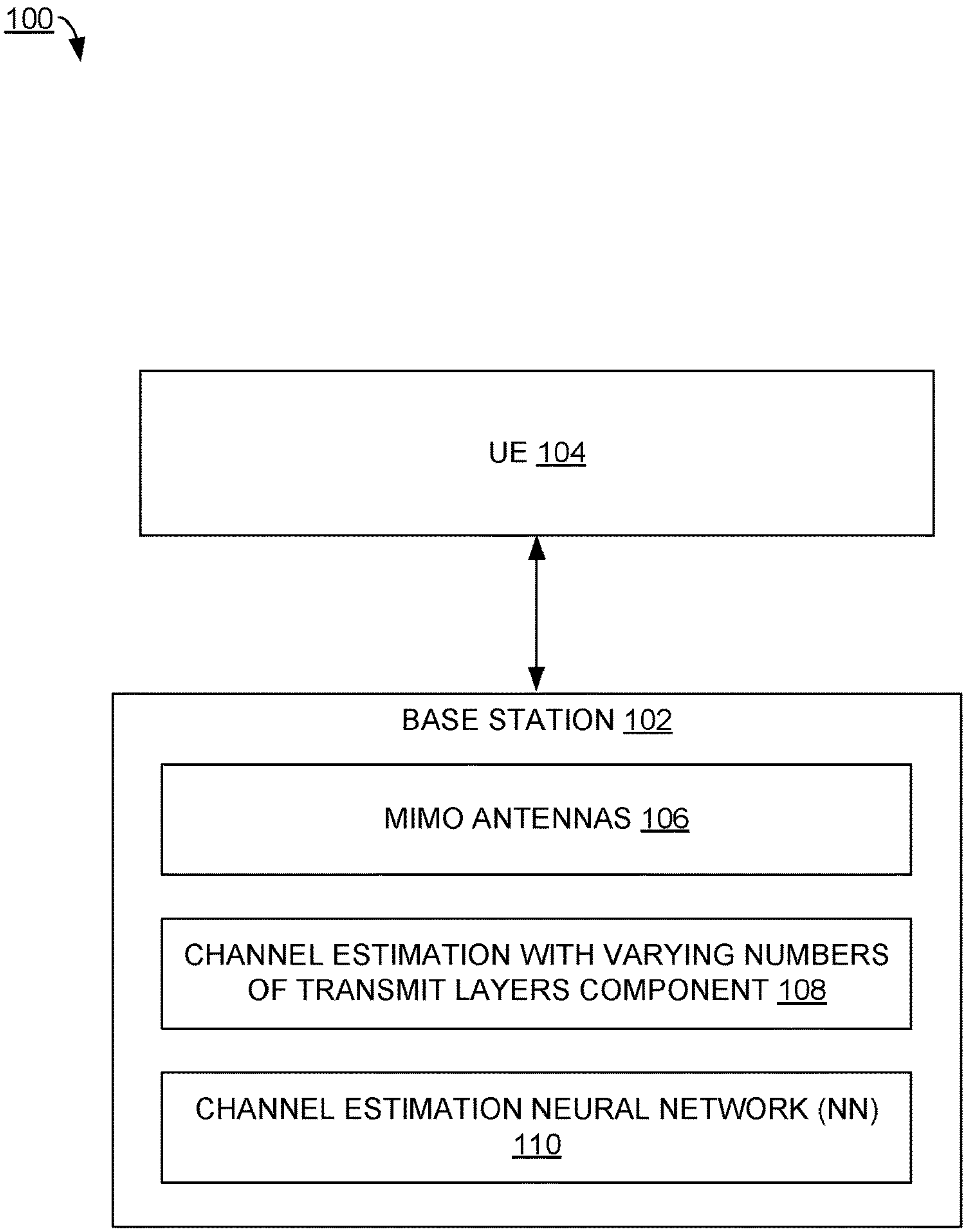
FIG. 1 illustrates an example system architecture that can facilitate channel estimation with varying numbers of transmit layers, in accordance with an embodiment of this disclosure.

FIG. 1 illustrates an example system architecture 100 that can facilitate channel estimation with varying numbers of transmit layers, in accordance with an embodiment of this disclosure.

System architecture 100 comprises base station 102 and UE 104. In turn, base station 102 comprises MIMO antennas 106, channel estimation with varying numbers of transmit layers component 108, and channel estimation neural network (NN) 110.

Figure 11:
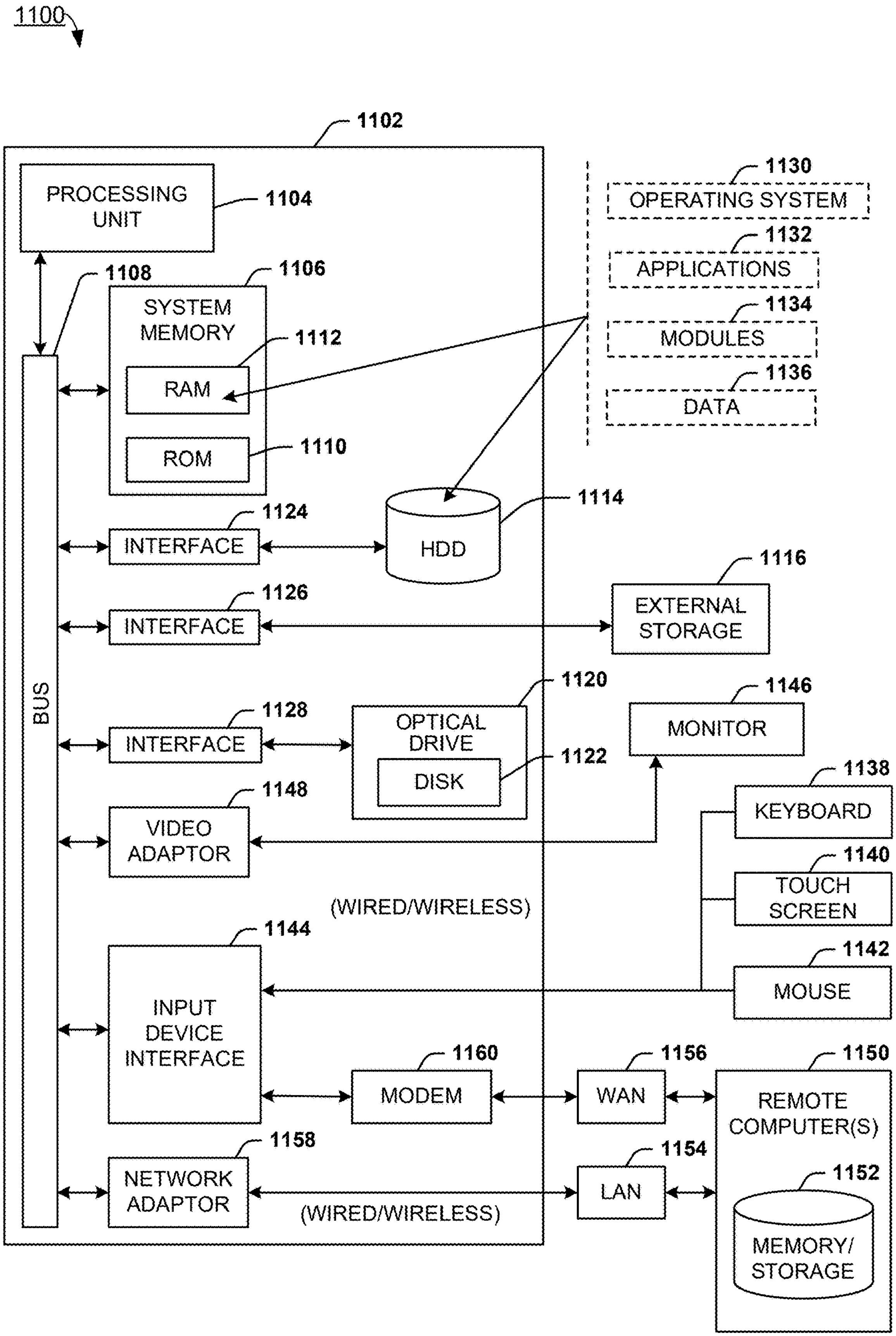
FIG. 11 illustrates an example block diagram of a computer operable to execute an embodiment of this disclosure.

Each of base station 102 and/or UE 104 can be implemented with part(s) of computing environment 1100 of FIG. 11.

UE 104 and base station 102 can conduct broadband cellular communications with each other across multiple transmit layers via MIMO antennas 106. As part of this, base station 102 can perform channel estimation for multiple transmit layers. Channel estimation with varying numbers of transmit layers component 108 can divide an array that includes a number of channels into multiple arrays (one for each channel) that are of a lower dimensionality. Channel estimation with varying numbers of transmit layers component 108 can input these multiple arrays into channel estimation NN 110, which can perform channel estimation on each of them. Channel estimation NN 110 can be configured to perform channel estimation where there is one transmit layer. After channel estimation NN 110 performs channel estimation on the multiple arrays, channel estimation with varying numbers of transmit layers component 108 can re-assemble the multiple output arrays into a channel estimation for the multiple transmit layers.

This act of transforming the array before and after channel estimation NN 110 operates on the arrays can be referred to as pre-processing and post-processing, respectively. In this manner pre-processing and post-processing can be performed on arrays with arbitrary numbers of transmit layers so that they can be operated on by channel estimation NN 110 (which can be configured to operate on arrays with only 1 transmit layer).

In some examples, channel estimation with varying numbers of transmit layers component 108 can implement part(s) of the process flows of FIGS. 8-10 to facilitate channel estimation with varying numbers of transmit layers.

It can be appreciated that system architecture 100 is one example system architecture for channel estimation with varying numbers of transmit layers, and that there can be other system architectures that facilitate channel estimation with varying numbers of transmit layers.

FIG. 2 illustrates an example system architecture 200 for neural-network-based channel estimation, in accordance with an embodiment of this disclosure. In some examples, part(s) of system architecture 200 can be implemented by part(s) of system architecture 100 to facilitate channel estimation with varying numbers of transmit layers.

System architecture 200 comprises received DM-RS 202, least squares channel estimation and interpolation 204, rough channel estimate 206, neural network (NN) 208, fine channel estimate 210, and channel estimation with varying numbers of transmit layers component 212 (which can be similar to channel estimation with varying numbers of transmit layers component 108 of FIG. 1).

FIG. 3 illustrates another example system architecture 300 that can facilitate channel estimation with varying numbers of transmit layers, in accordance with an embodiment of this disclosure. In some examples, part(s) of system architecture 300 can be implemented by part(s) of system architecture 100 to facilitate channel estimation with varying numbers of transmit layers.

System architecture 300 comprises received DM-RS 302, least squares channel estimation and interpolation 304, rough channel estimate 306 (CH1), pre-processing 308, CH2 310, neural network (NN) 312, CH3 314, post-processing 316, and fine channel estimate 318 (CH4).

FIG. 4 illustrates an example 400 of a demodulation reference signal (DM-RS) grid that can facilitate channel estimation with varying numbers of transmit layers, in accordance with an embodiment of this disclosure. In some examples, part(s) of example 400 can be implemented by part(s) of system architecture 100 to facilitate channel estimation with varying numbers of transmit layers.

Example 400 comprises DM-RS positions 402, subcarriers 404, OFDM symbols 406, and channel estimation with varying numbers of transmit layers component 408 (which can be similar to channel estimation with varying numbers of transmit layers component 108 of FIG. 1).

Figure 6:
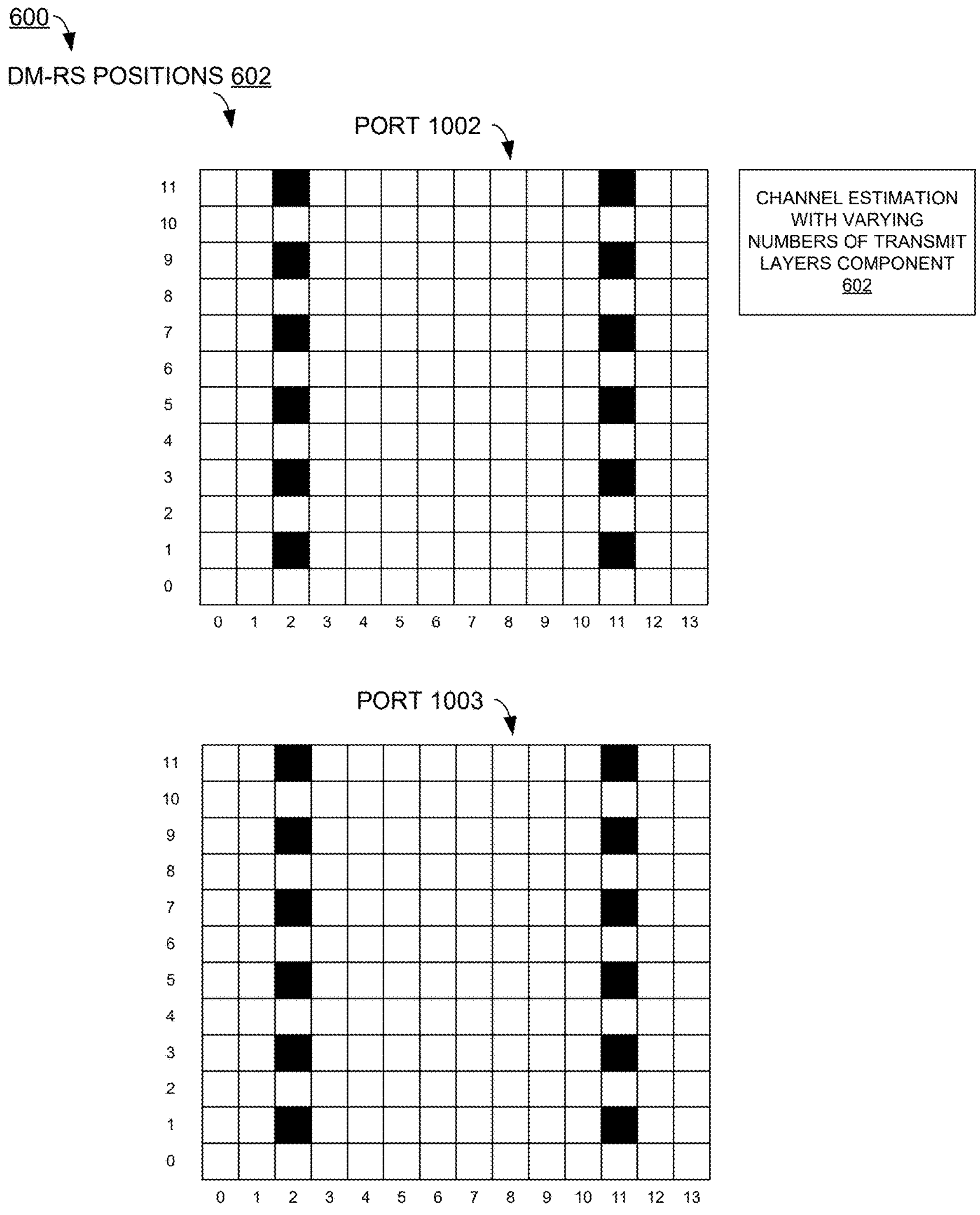

FIG. 5 and FIG. 6 illustrate an example (shown here as example 500 and example 600) of a DM-RS grid for four antenna ports that can facilitate channel estimation with varying numbers of transmit layers, in accordance with an embodiment of this disclosure. In some examples, part(s) of example 500 and example 600 can be implemented by part(s) of system architecture 100 to facilitate channel estimation with varying numbers of transmit layers.

Example 500 comprises DM-RS positions 502 and channel estimation with varying numbers of transmit layers component 504 (which can be similar to channel estimation with varying numbers of transmit layers component 108 of FIG. 1). Example 600 comprises DM-RS positions 602 and channel estimation with varying numbers of transmit layers component 604 (which can be similar to channel estimation with varying numbers of transmit layers component 108 of FIG. 1). Together, example 500 and example 600 can illustrate DM-RS positions that can be used together for port 1000, port 1001, port 1002, and port 1003.

FIG. 7 illustrates an example graph 700 of 2×2 channel estimation mean squared error (MSE) performance that can facilitate channel estimation with varying numbers of transmit layers, in accordance with an embodiment of this disclosure. In some examples, part(s) of graph 700 can be implemented by part(s) of system architecture 100 to facilitate channel estimation with varying numbers of transmit layers.

Graph 700 comprises MSE 702, signal-to-noise (SNR) (decibels (dB)) 704, LS (rough estimation) 706, pre-processing+convolutional neural network (CNN) (1 red-green-blue (RGB) channel)+post-processing 708, and CNN (2 red-green-blue (RGB) channels) 710.

Example Process Flows

FIG. 8 illustrates an example process flow 800 for channel estimation with varying numbers of transmit layers, in accordance with an embodiment of this disclosure. In some examples, one or more embodiments of process flow 800 can be implemented by system architecture 100 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 500 of FIG. 5, process flow 900 of FIG. 9, and/or process flow 1000 of FIG. 10.

Process flow 800 begins with 802, and moves to operation 804.

Operation 804 depicts performing a least squares channel estimation and interpolation with respect to a communications channel to produce a rough channel estimate, wherein the rough channel estimate comprises a first array of a first number of dimensions, wherein the communications channel enables broadband cellular communications with at least one user equipment, and wherein the communications channel is configured for multiple-input multiple-output transmission. That is, process flow 800 can be implemented with a gNB conducting MIMO cellular communications.

In some examples, the first array comprises five dimensions, and wherein respective dimensions of the dimensions indicate a number of subcarriers used for transmission, a number of orthogonal frequency-division multiplexing symbols in one slot, a number of received antennas, a number of transmit layers, and a number of samples. That is, the first array can be of the form CH1: (K, N, R, L, numSamples).

After operation 804, process flow 800 moves to operation 806.

Operation 806 depicts transforming the first array into second arrays, wherein respective second arrays of the second arrays have a second number of dimensions, and wherein the second number is one less than the first number of dimensions. This can be pre-processing as described herein.

In some examples, the respective second arrays comprise four dimensions, and respective dimensions of the dimensions indicate a number of subcarriers used for transmission, a number of orthogonal frequency-division multiplexing symbols in one slot, a number of received antennas, and a product of a number of transmit layers and a number of samples. That is, the second arrays can be of the form, CH2: (K, N, R, L×numSamples)

After operation 806, process flow 800 moves to operation 808.

Operation 808 depicts processing the respective second arrays using a neural network that is configured to process arrays having the second number of dimensions, to produce third arrays. This can include using a neural network for channel estimation, as described herein.

In some examples, respective third arrays of the third arrays comprise four dimensions, and respective dimensions of the dimensions indicate a number of subcarriers used for transmission, number of orthogonal frequency-division multiplexing symbols in one slot, a number of received antennas, and a product of a number of transmit layers and a number of samples. That is, the third arrays can be of the form, CH3: (K, N, R, L×numSamples).

In some examples, the neural network is configured to process arrays that indicate one transmit layer. In some examples, the first array indicates more than one transmit layer. That is, channel estimation can be performed on an array having more than one transmit layer (e.g., CH1), using a neural network that is configured to operate on arrays that indicate one transmit layer. This can be effectuated by performing pre-processing before passing input to the neural network, and post-processing on an output of the neural network.

After operation 808, process flow 800 moves to operation 810.

Operation 810 depicts combining the third arrays into a fourth array having the first number of dimensions, wherein the fourth array indicates a second channel estimate. This can be post-processing as described herein.

In some examples, the fourth array comprises five dimensions, and respective dimensions of the dimensions indicate a number of subcarriers used for transmission, a number of orthogonal frequency-division multiplexing symbols in one slot, a number of received antennas, a number of transmit layers, and a number of samples. That is, the fourth array can be of the form, CH4: (k, n, r, l, s).

After operation 810, process flow 800 moves to operation 812.

Operation 812 depicts using the fourth array for the broadband cellular communications with the at least one user equipment. This can involve using the channel estimation from operation 810 for cellular communications with UE.

After operation 812, process flow 800 moves to 814, where process flow 800 ends.

FIG. 9 illustrates an example process flow 900 for channel estimation with varying numbers of transmit layers, in accordance with an embodiment of this disclosure. In some examples, one or more embodiments of process flow 900 can be implemented by system architecture 100 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 800 of FIG. 8, and/or process flow 1000 of FIG. 10.

Process flow 900 begins with 902, and moves to operation 904.

Operation 904 depicts transforming a first array into second arrays, wherein the first array comprises a rough channel estimate over a first number of dimensions, wherein respective second arrays of the second arrays have a second number of dimensions, and wherein the second number is less than the first number. In some examples, operation 904 can be implemented in a similar manner as operation 806 of FIG. 8.

In some examples, a first dimension of the first array indicates a number of transmit layers, a second dimension of the first array indicates a number of samples, and a third dimension of the second arrays indicates a product of the number of transmit layers and the number of samples. This can involve the operation on L and numSamples in CH2(k, n,r,s+(l−1)×numSamples)=CH1(k,n,r,l,s).

In some examples, a third number of the second arrays corresponds to a fourth number of receive antennas of the system. In some examples, the second arrays correspond to a fifth number of samples over a time domain. That is, with pre-processing, a size of the arrays at the output of the pre-processing unit can be independent of L (a number of transmit (Tx) layers). These pre-processed arrays can then be processed by a neural network in a serial manner.

After operation 904, process flow 900 moves to operation 906.

Operation 906 depicts processing the respective second arrays with a neural network that is configured to process arrays having the second number of dimensions, to produce third arrays. In some examples, operation 906 can be implemented in a similar manner as operation 808 of FIG. 8.

In some examples, the first array indicates at least two transmit layers, wherein the neural network is configured to operate on arrays that indicate one transmit layer, and wherein the fourth array indicates the at least two transmit layers. That is, channel estimation can be performed on an array having more than one transmit layer (e.g., CH1), using a neural network that is configured to operate on arrays that indicate one transmit layer. This can be effectuated by performing pre-processing before passing input to the neural network, and post-processing on an output of the neural network.

In some examples, the neural network has a fixed input layer size and a fixed output layer size. That is, a fixed input layer and output layer size of the neural network can match one specific channel estimation size. This can be one transmit layer, and pre-processing and post-processing can be implemented to facilitate using this neural network with channel estimations having arbitrary numbers of transmit layers.

In some examples, the neural network has a fixed input layer size and a fixed output layer size.

After operation 906, process flow 900 moves to operation 908.

Operation 908 depicts combining the third arrays into a fourth array having the first number of dimensions, wherein the fourth array indicates a channel estimate. In some examples, operation 908 can be implemented in a similar manner as operation 810 of FIG. 8.

After operation 908, process flow 900 moves to operation 910.

Operation 910 depicts using the fourth array for broadband cellular communications with at least one user equipment. In some examples, operation 910 can be implemented in a similar manner as operation 812 of FIG. 8.

In some examples, the at least one user equipment is at least one first user equipment, the rough channel estimate is a first rough channel estimate, the channel estimate is a first channel estimate, operation 910 comprises transforming a fifth array into sixth arrays, wherein the sixth arrays comprise the rough channel estimate over the first number of dimensions, wherein respective sixth arrays of the sixth arrays have the second number of dimensions, and wherein a first number of transmit layers of the first array differs from a second number of transmit layers of the fifth array; processing the respective sixth arrays with the neural network to produce seventh arrays, wherein the seventh arrays indicate a second channel estimate; combining the seventh arrays into an eighth array having the first number of dimensions; and using the eighth array for channel estimation for broadband cellular communications with at least one second user equipment. That is, the present techniques can facilitate using one neural network for channel estimation with an arbitrary number of transmit layers. Here, the first array indicates one number of transmit layers, and the fifth array indicates another number of transmit layers.

After operation 910, process flow 900 moves to 912, where process flow 900 ends.

FIG. 10 illustrates an example process flow 1000 for channel estimation with varying numbers of transmit layers, in accordance with an embodiment of this disclosure. In some examples, one or more embodiments of process flow 1000 can be implemented by system architecture 100 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 500 of FIG. 5, process flow 800 of FIG. 8, and/or process flow 900 of FIG. 9.

Process flow 1000 begins with 1002, and moves to operation 1004.

Operation 1004 depicts transforming a rough channel estimate array that comprises a first number of dimensions and a dimension that indicates a number of transmit layers into first arrays having a second number of dimensions, wherein respective first arrays of the first arrays omit an indication of the number of transmit layers. In some examples, operation 1004 can be implemented in a similar manner as operation 806 of FIG. 8.

In some examples, operation 1004 comprises generating the rough channel estimate array by performing least squares estimate and interpolation based on demodulation reference signal information that corresponds to the multiple-input multiple-output cellular communications. That is, given a received DM-RS, a channel corresponding to DM-RS positions in the array can be estimated using least squares (LS) technique. Then interpolation can be used to obtain rough channel estimates in all point of the 4-D channel array of dimensions (K, N, R, L).

In some examples, transforming the rough channel estimate array comprises splitting the rough channel estimate array in a transmit layer dimension.

After operation 1004, process flow 1000 moves to operation 1006.

Operation 1006 depicts inputting the first arrays to a neural network that is configured to accept, as input, arrays having the second number of dimensions, the inputting resulting in an output of second arrays. In some examples, operation 1006 can be implemented in a similar manner as operation 808 of FIG. 8.

In some examples, the neural network omits a configuration to accept as input arrays having the first number of dimensions. That is, it can be that the neural network is not configured to operate on the original rough channel estimation array because it has multiple transmit layers.

After operation 1006, process flow 1000 moves to operation 1008.

Operation 1008 depicts transforming the second arrays into a third array that indicates a channel estimation and that has the first number of dimensions. In some examples, operation 1008 can be implemented in a similar manner as operation 810 of FIG. 8.

In some examples, transforming the second arrays into the third array comprises combining the second arrays in the transmit layer dimension. This can comprise post-processing, and can be the reverse of pre-processing in operation 1004, which comprises splitting the rough channel estimate array in the transmit layer dimension.

In some examples, the transforming of the rough channel estimate array comprises performing pre-processing relative to the processing of the first arrays with the neural network, the transforming of the second arrays comprises performing post-processing relative to the processing of the first arrays with the neural network, and the pre-processing and the post-processing are configured to utilize the neural network for channel estimation for differing numbers of transmit layers. That is, a dependence of channel estimation problem size to the number of receiver (Rx) antennas can be resolved by pre-/post-processing units so that one single neural network can be used for channel estimation for an arbitrary number of transmit layer.

After operation 1008, process flow 1000 moves to operation 1010.

Operation 1010 depicts using the channel estimation as indicated by the third array for multiple-input multiple-output cellular communications with a user equipment. In some examples, operation 1010 can be implemented in a similar manner as operation 812 of FIG. 8.

After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of base station 102 and/or UE 104 of FIG. 1.

In some examples, computing environment 1100 can implement one or more embodiments of the process flows of FIGS. 8-10 to facilitate channel estimation with varying numbers of transmit layers.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 (containing disk 1122) can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1116 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

performing a least squares channel estimation and interpolation with respect to a communications channel to produce a rough channel estimate, wherein the rough channel estimate comprises a first array of a first number of dimensions, wherein the communications channel enables broadband cellular communications with at least one user equipment, and wherein the communications channel is configured for multiple-input multiple-output transmission;

transforming the first array into second arrays, wherein respective second arrays of the second arrays have a second number of dimensions, and wherein the second number is one less than the first number of dimensions;

processing the respective second arrays using a neural network that is configured to process arrays having the second number of dimensions, to produce third arrays;

combining the third arrays into a fourth array having the first number of dimensions, wherein the fourth array indicates a second channel estimate; and using the fourth array for the broadband cellular communications with the at least one user equipment.

2. The system of claim 1, wherein the first array comprises five dimensions, and wherein respective dimensions of the dimensions indicate a number of subcarriers used for transmission, a number of orthogonal frequency-division multiplexing symbols in one slot, a number of received antennas, a number of transmit layers, and a number of samples.

3. The system of claim 1, wherein the respective second arrays comprise four dimensions, and wherein respective dimensions of the dimensions indicate a number of subcarriers used for transmission, a number of orthogonal frequency-division multiplexing symbols in one slot, a number of received antennas, and a product of a number of transmit layers and a number of samples.

4. The system of claim 1, wherein respective third arrays of the third arrays comprise four dimensions, and wherein respective dimensions of the dimensions indicate a number of subcarriers used for transmission, number of orthogonal frequency-division multiplexing symbols in one slot, a number of received antennas, and a product of a number of transmit layers and a number of samples.

5. The system of claim 1, wherein the fourth array comprises five dimensions, and wherein respective dimensions of the dimensions indicate a number of subcarriers used for transmission, a number of orthogonal frequency-division multiplexing symbols in one slot, a number of received antennas, a number of transmit layers, and a number of samples.

6. The system of claim 1, wherein the neural network is configured to process arrays that indicate one transmit layer.

7. The system of claim 6, wherein the first array indicates more than one transmit layer.

8. A method, comprising:

transforming, by a system comprising at least one processor, a first array into second arrays, wherein the first array comprises a rough channel estimate over a first number of dimensions, wherein respective second arrays of the second arrays have a second number of dimensions, and wherein the second number is less than the first number;

processing, by the system, the respective second arrays with a neural network that is configured to process arrays having the second number of dimensions, to produce third arrays;

combining, by the system, the third arrays into a fourth array having the first number of dimensions, wherein the fourth array indicates a channel estimate; and using, by the system, the fourth array for broadband cellular communications with at least one user equipment.

9. The method of claim 8, wherein the first array indicates at least two transmit layers, wherein the neural network is configured to operate on arrays that indicate one transmit layer, and wherein the fourth array indicates the at least two transmit layers.

10. The method of claim 8, wherein a first dimension of the first array indicates a number of transmit layers, wherein a second dimension of the first array indicates a number of samples, and wherein a third dimension of the second arrays indicates a product of the number of transmit layers and the number of samples.

11. The method of claim 8, wherein the at least one user equipment is at least one first user equipment, wherein the rough channel estimate is a first rough channel estimate, wherein the channel estimate is a first channel estimate, and further comprising:

transforming, by the system, a fifth array into sixth arrays, wherein the sixth arrays comprise the rough channel estimate over the first number of dimensions, wherein respective sixth arrays of the sixth arrays have the second number of dimensions, and wherein a first number of transmit layers of the first array differs from a second number of transmit layers of the fifth array;

processing, by the system, the respective sixth arrays with the neural network to produce seventh arrays, wherein the seventh arrays indicate a second channel estimate;

combining, by the system, the seventh arrays into an eighth array having the first number of dimensions; and using, by the system, the eighth array for channel estimation for broadband cellular communications with at least one second user equipment.

12. The method of claim 8, wherein a third number of the second arrays corresponds to a fourth number of receive antennas of the system.

13. The method of claim 8, wherein the neural network omits a configuration to accept as input arrays having the first number of dimensions.

14. The method of claim 8, wherein the neural network has a fixed input layer size and a fixed output layer size.

15. A non-transitory computer-readable medium comprising instructions that, in response to execution, cause a system comprising at least one processor to perform operations, comprising:

transforming a rough channel estimate array that comprises a first number of dimensions and a dimension that indicates a number of transmit layers into first arrays having a second number of dimensions, wherein respective first arrays of the first arrays omit an indication of the number of transmit layers;

inputting the first arrays to a neural network that is configured to accept, as input, arrays having the second number of dimensions, the inputting resulting in an output of second arrays;

transforming the second arrays into a third array that indicates a channel estimation and that has the first number of dimensions; and using the channel estimation as indicated by the third array for multiple-input multiple-output cellular communications with a user equipment.

16. The non-transitory computer-readable medium of claim 15, wherein the operations further comprise:

generating the rough channel estimate array by performing least squares estimate and interpolation based on demodulation reference signal information that corresponds to the multiple-input multiple-output cellular communications.

17. The non-transitory computer-readable medium of claim 15, wherein transforming the rough channel estimate array comprises:

splitting the rough channel estimate array in a transmit layer dimension.

18. The non-transitory computer-readable medium of claim 17, wherein transforming the second arrays into the third array comprises:

combining the second arrays in the transmit layer dimension.

19. The non-transitory computer-readable medium of claim 15, wherein the transforming of the rough channel estimate array comprises performing pre-processing relative to the processing of the first arrays with the neural network, wherein the transforming of the second arrays comprises performing post-processing relative to the processing of the first arrays with the neural network, and wherein the pre-processing and the post-processing are configured to utilize the neural network for channel estimation for differing numbers of transmit layers.

20. The non-transitory computer-readable medium of claim 15, wherein the neural network omits a configuration to accept as input arrays having the first number of dimensions.

* * * * *